United States Patent [19]

Rhonehouse

[11] 4,332,608
[45] Jun. 1, 1982

[54] CHAIN DRIVE MECHANISM FOR EQUIPMENT FOR HEATING AND COOLING WORKPIECES

[76] Inventor: Donald E. Rhonehouse, Box 10, Rte. 1, Cecil, Ohio 45821

[21] Appl. No.: 172,245

[22] Filed: Jul. 25, 1980

Related U.S. Application Data

[63] Continuation-in-part of Ser. No. 43,357, May 29, 1979, Pat. No. 4,297,121, and a continuation-in-part of Ser. No. 113,828, Jan. 21, 1980, Pat. No. 4,300,937.

[51] Int. Cl.³ .............................................. C03B 35/18
[52] U.S. Cl. ...................................... 65/348; 65/349; 65/350; 198/789
[58] Field of Search ................ 65/114, 115, 348, 349, 65/350, 351; 198/789, 790

[56] References Cited

U.S. PATENT DOCUMENTS 633,572  9/1899  Cromwell ........................... 198/790

FOREIGN PATENT DOCUMENTS 1560309  2/1969  France ............................... 198/789

Primary Examiner—Arthur D. Kellogg
Attorney, Agent, or Firm—Irving M. Weiner; Pamela S. Burt; John L. Shortley

[57] ABSTRACT

A conveyor for a glass-treating furnace has ceramic rollers forming the conveying bed for the glass to be treated. The rollers are of uniform section throughout their length, and are supported adjacent opposite ends on driving rolls. The rollers directly contact the surfaces of the driving rolls and drive to the rollers is effected by frictional contact only. The rollers are held in position by a pair of adjacent driving rolls, and two driving rolls cooperate in driving the ceramic rollers. The rollers do not have any pins or other projections. The life of the rollers is extended and removal of old rollers and insertion of new rollers is facilitated.

3 Claims, 16 Drawing Figures

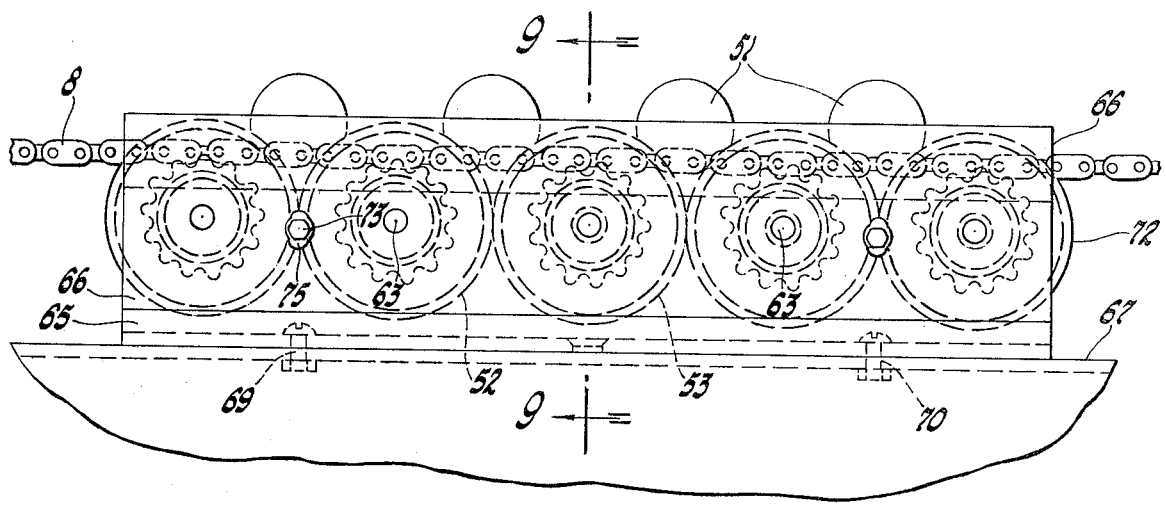
FIG.8
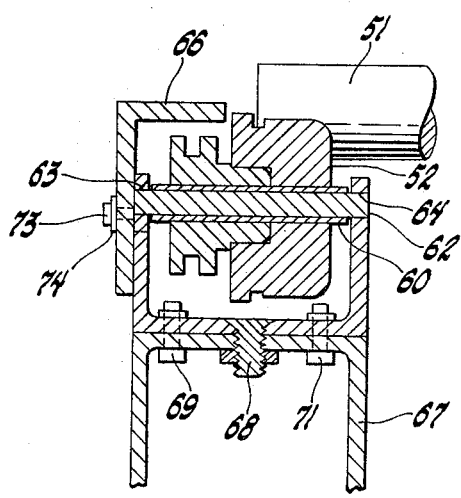
FIG.9
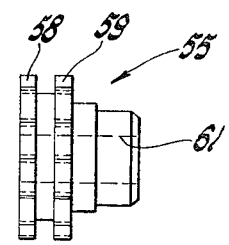
FIG.10
FIG.11
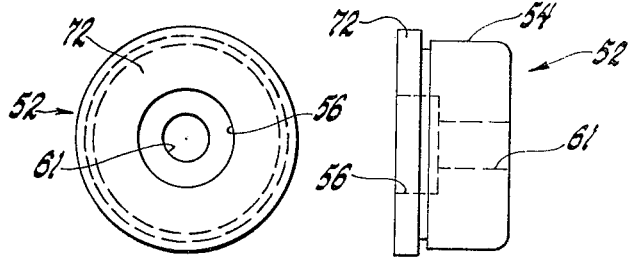
FIG.12
FIG.13
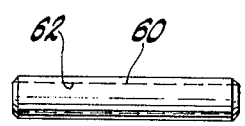
FIG.14
FIG.15
FIG.16

CHAIN DRIVE MECHANISM FOR EQUIPMENT FOR HEATING AND COOLING WORKPIECES

CROSS REFERENCE TO RELATED APPLICATIONS

This application is a continuation-in-part of U.S. patent applications Ser. No. 43,357, filed May 29, 1979, now U.S. Pat. No. 4,297,121 and Ser. No. 113,828, filed Jan. 21, 1980, now U.S. Pat. No. 4,300,937, the disclosures of which are incorporated herein by reference thereto.

TECHNICAL FIELD

The present invention relates generally to glass manufacturing or treating equipment, and more particularly to a conveyor for a glass-tempering furnace.

BACKGROUND OF THE INVENTION

Glass-treating furnaces, such as used in tempering systems, employ rollers driven by belts, or chains and sprockets, to form a conveyor for carrying glass through the heating and quenching sections. The rollers are formed of a ceramic material so as to withstand the heat in the furnace. They are usually directly engaged by the belt or chains which are used to effect the rotation of the rollers. Further, the rollers usually have pins or other projecting elements which are received in slots or openings whereby the rollers are fixed vertically and horizontally. The glass rests directly on the rollers and is moved along by rotation of the rollers. It is known that the glass must be oscillated when it is in the furnace section in order to ensure uniform heating and to prevent breakage, crazing or other undesirable results. The glass cannot be simply heated or quenched while it is motionless. It must be rotated back and forth so that the temperature does not vary along the sheet of glass.

Direct drive of the rollers by a chain involves direct contact between the chain and the rollers or the chain sprockets and the rollers. When connecting a metal or other composition type sprocket, to a ceramic or similar type roller, no matter what the mode of connection involves, one will always be faced with the matter of unlike substances expanding and/or contracting (due to the heat cycling involved in normal operation), thus causing seperation, cracking and even complete fracture, at the point of connection. Direct drive by a belt can result in damage to the belt, and/or the roller. Damage to the roller occurs due to the abrasion between the roller and the steel type flat belt. This can be substantially lessened through the use of a cloth or composition drive belt. However, to date the cloth and/or composition belt, has been limited in its usefullness. It has been observed, that while the cloth type belts do work rather well in the shorter length equipment, (approximately fifty feet and under), the longer equipment tends to encounter far greater stresses than can be tolerated by the cloth type materials now available.

Being forced, thus far, to use the steel type belts on the longer equipment, one has had to accept the roller wear, along with frequent belt damage. This belt damage, is generally due to particles of foreign material, (namely pieces of glass), becoming lodged between said belt and the flat surfaced drive wheels. The pressure normally present between these two surfaces being very great, causes an indentation upon said flat belt. These dents are very undesirable, as they create a lifting effect upon the rollers as the dents pass under.

Further, the use of pins or shafts received within the rollers, as a means for guiding the rollers, creates move problems. Very often the rollers will fail at the point of connection between the pins and the rollers. One common method is to wedge a pin into the roller itself. This is a source of stress, particularly under the high temperatures encountered. On occasions pins will fail and they must be replaced. There is further danger of damaging the rollers when this is done.

McMaster U.S. Pat. No. 3,994,711 shows the use of pin-like extensions on the rollers coupled with slots, and/or positioning members which cooperate with reduced extensions of the rollers, as a means for maintaining positions of the rollers. The McMaster patent also shows directly driving the rollers by the chain.

The present invention provides a guiding and supporting arrangement for the rollers which does not require pins or other projections from the roller, and a drive in which the roller is not directly engaged with a chain or belt. The invention provides a self-centering conveyor roller system, and a system in which the rollers are of uniform size and shape throughout their length. They do not require any inserted pins, nor do they have any reduced sections or the like at their ends. Nonetheless, they will remain in proper position. They also will be driven without the need for direct contact with the belt or chain. The invention further provides a system in which the rollers can be easily removed and replaced. They simply rest upon driving means from which they can be lifted off without any concern for their relationship within pin receiving openings or guides.

SUMMARY OF THE INVENTION

The present invention also provides a conveyor for a glass-treating furnace such as a tempering furnace, having at least a pair of drive rolls on the opposite sides of the furnace, and means rotatably supporting the pairs of drive rolls. The drive rolls form aligned conveyor roller receiving sections adjacent the opposite sides of the machine. A heat resistant conveyor roller extends across the furnace and is supported adjacent to the respective opposite sides of the furnace in the roller receiving sections of the pairs of drive rolls. The periphery of the heat resisting roller is in driving contact with the surfaces of the respective drive rolls, and there is means for driving the drive rolls to effect rotation of the roller. The invention also includes the concept of transmitting drive from the drive rolls to the roller by frictional contact alone.

It is further an object of the invention to provide a drive roll having a driving portion contacting the heat resistant roller and a driving section, together with means for securing the driven section to the driving portion.

It is a further object of the invention to provide a common shaft for supporting the driven section and the driving portion of the drive rolls.

It is an additional object of the invention to provide a restraining flange on the drive rolls extending above the area of contact of the roller with the drive rolls so as to form a means for limiting endwise movement of the heat resisting roller, and for maintaining position of the latter roller.

BRIEF DESCRIPTION OF THE DRAWINGS

FIG. 8 is a fragmentary side elevational view of a conveyor.

FIG. 9 is a sectional elevational view taken along line 9—9 of FIG. 8.

FIG. 10 is an end view of a sprocket.

FIG. 11 is a side view of the sprocket shown in FIG. 10.

FIG. 12 is a end view of a driven roller section.

FIG. 13 is a side view of the roller section in FIG. 12.

FIG. 14 is a side view of a bushing.

FIG. 15 is an end view of the bushing in FIG. 14.

FIG. 16 is a side elevational view of a shaft.

BEST MODE FOR CARRYING OUT THE INVENTION

FIGS. 1-7 illustrate a glass-tempering system incorporating novel features of the chain drive mechanism. The tempering furnace comprises a loading section 1, modular furnace frame sections 2, 3 and 4, a quench section 5, and a takeout or unload section 6 (see FIGS. 1 and 2).

Figure 1:
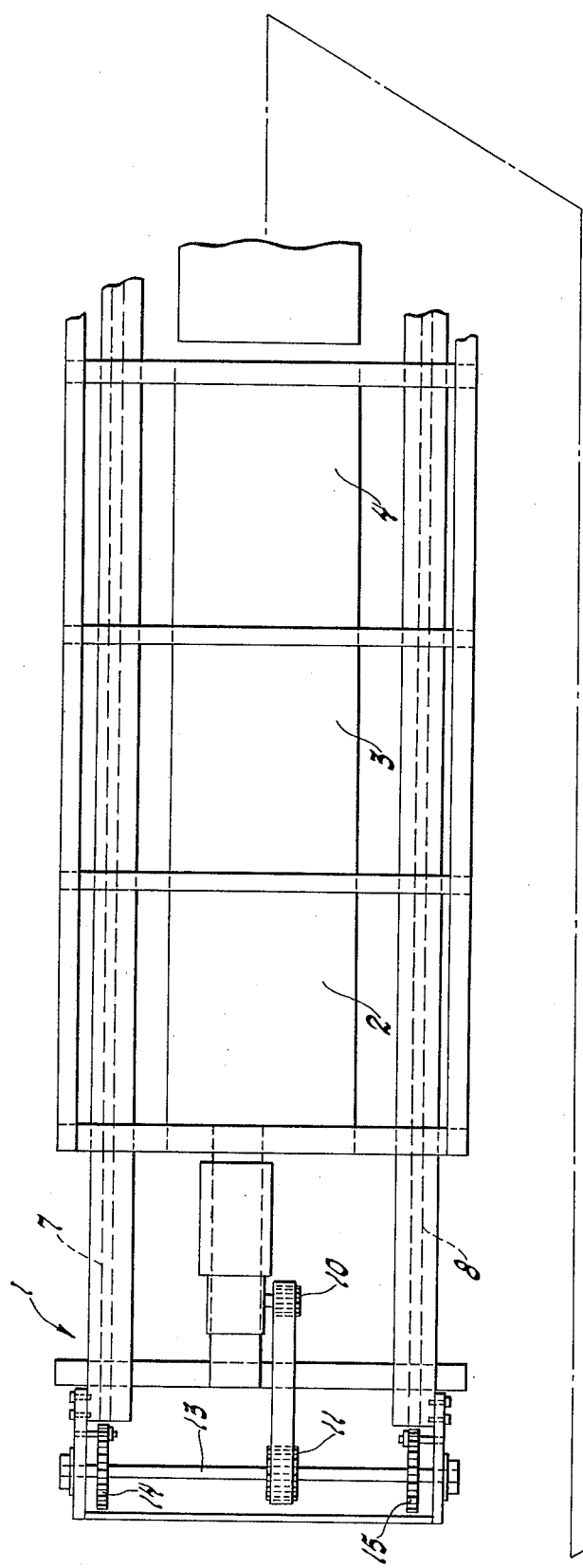
FIG. 1 is a top plan view of a glass-treating system in accordance with the invention.
Figure 1:
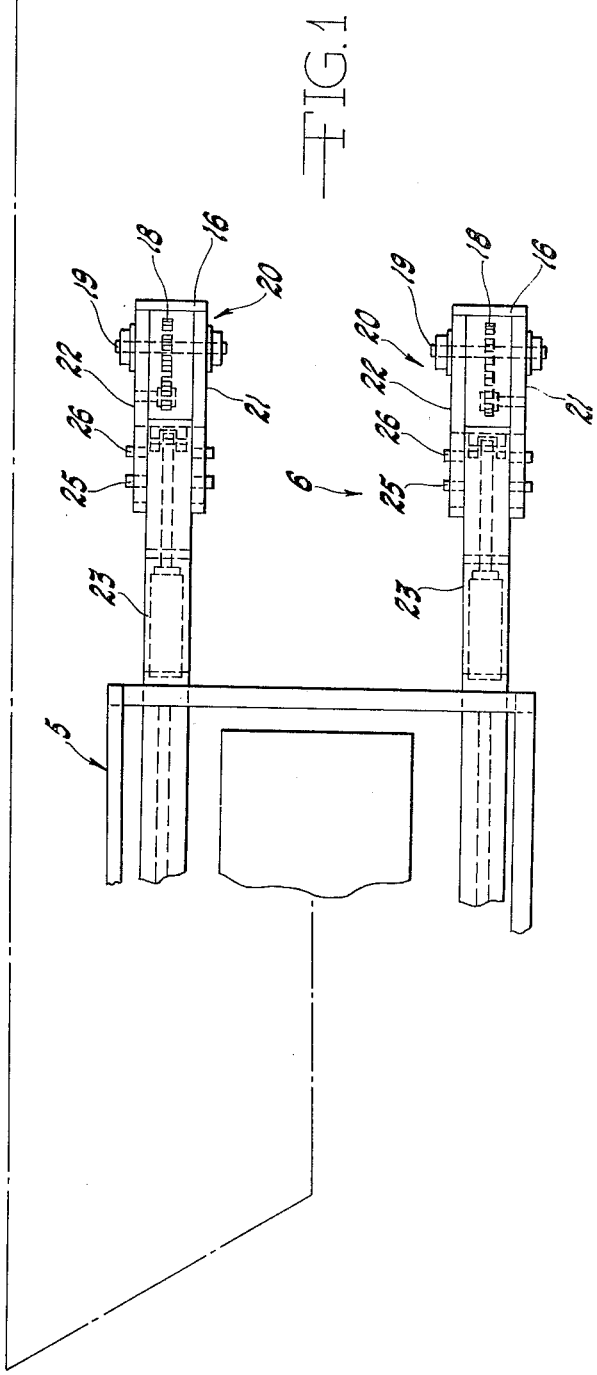
Figure 2:
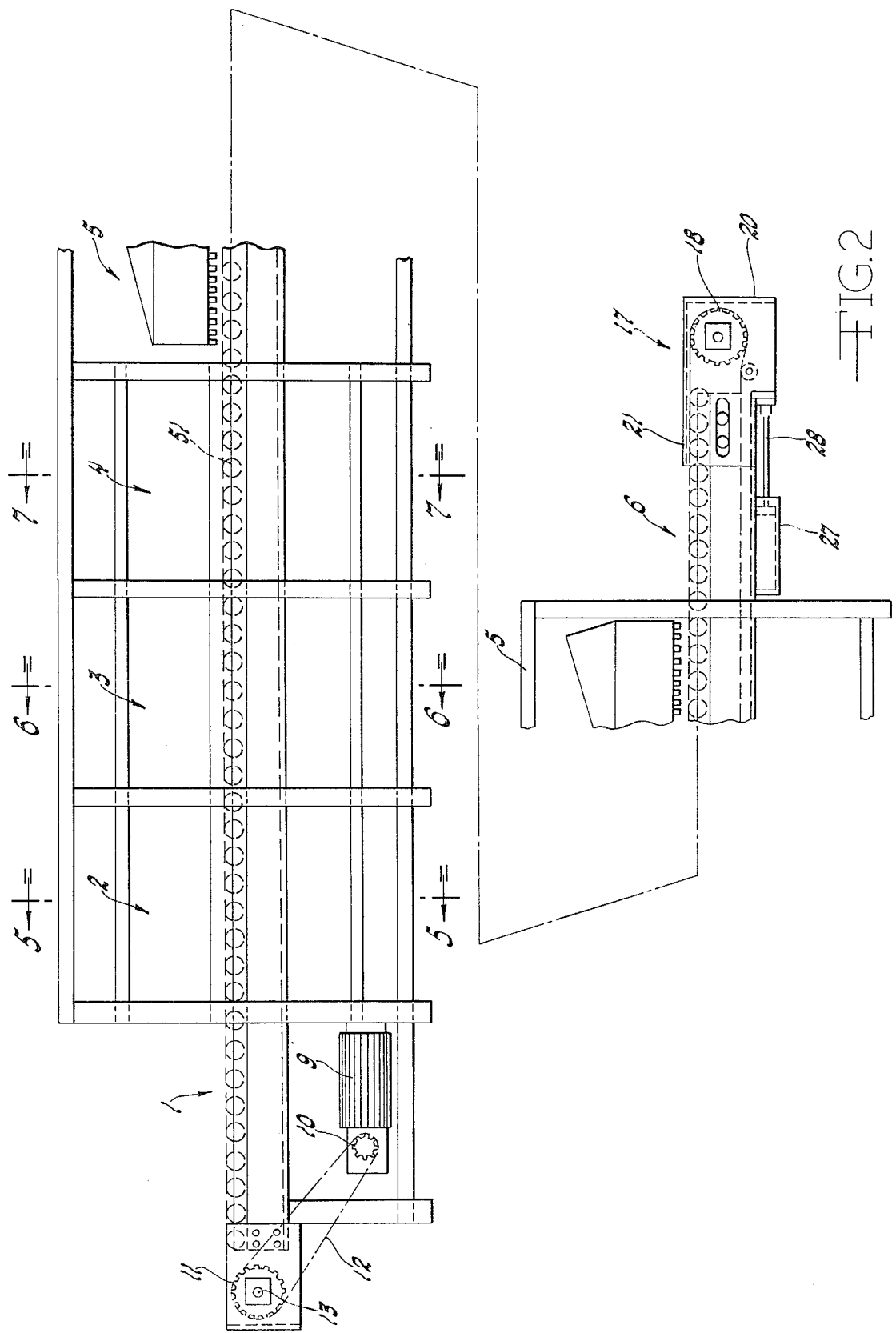
FIG. 2 is a side elevational view of the system shown in FIG. 1.
Figure 4:
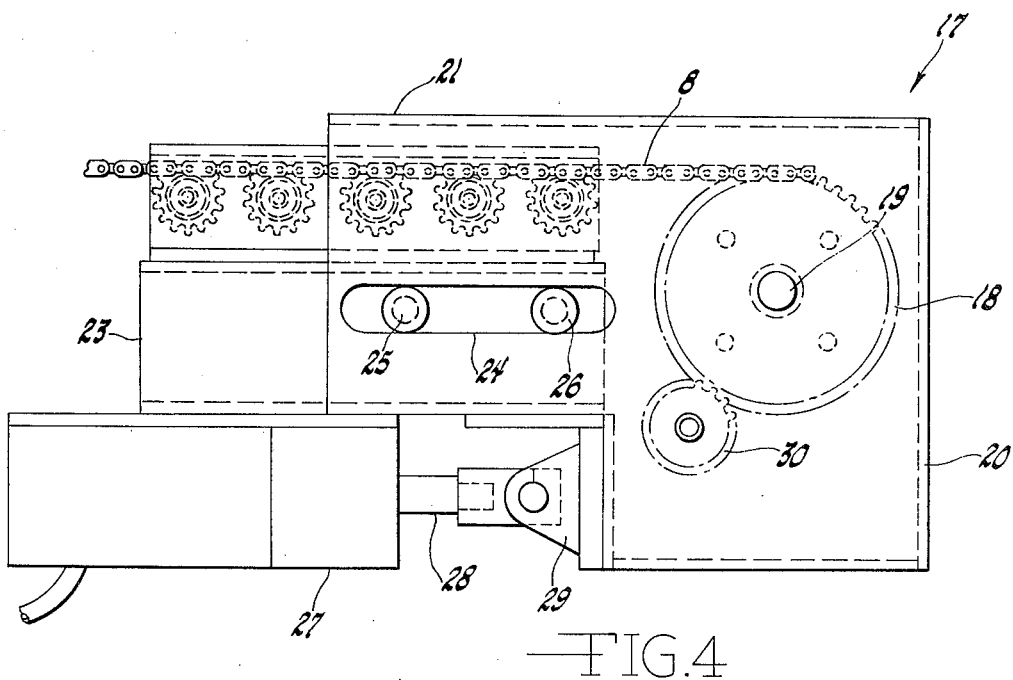
FIG. 4 is a side elevational view of a tensioning section of the conveyor illustrated in FIG. 2.

As will be described in some detail below, the furnace embodies a chain drive system for driving a series of rollers which support the glass to be treated. The drive system generally involves the following components, chains 7 and 8 (see FIGS. 1 and 2), a driving motor 9 having suitable pulleys and belts or chains 10, 11 and 12, a cross shaft 13, and driving sprockets 14 and 15 engaged with the chains 7 and 8. The drive is usually provided at one end of the machine and very often a take-up section, such as illustrated in FIGS. 1 and 4, is utilized to keep proper tension on the chain or belt. As illustrated in the latter figures, paired take-up arrangements 16 and 17 are provided at the opposite end of the furnace from the drive. These take-up devices are identical in construction and only one therefore will be described. Each take-up device comprises a sprocket 18 mounted upon a shaft 19. The sprocket is mounted within a frame 20 having a pair of arms 21 and 22 extending along the sides of projections 23 of the main frame of the furnace. The arms 21 and 22 are provided with slots 24. The frames 20 can be moved along the pins 25 and 26. The means for effecting this movement in the preferred embodiment comprises a hydraulic motor 27 having a piston (not shown) and operating rod 28. The motor is connected to the frame extension 23 while the rod is connected to a bracket 29. A suitable source of fluid and control means, known in the arts, are provided for powering the motor 27 to provide tension upon the chain 8 which is engaged with the sprocket 18.

Figure 3:
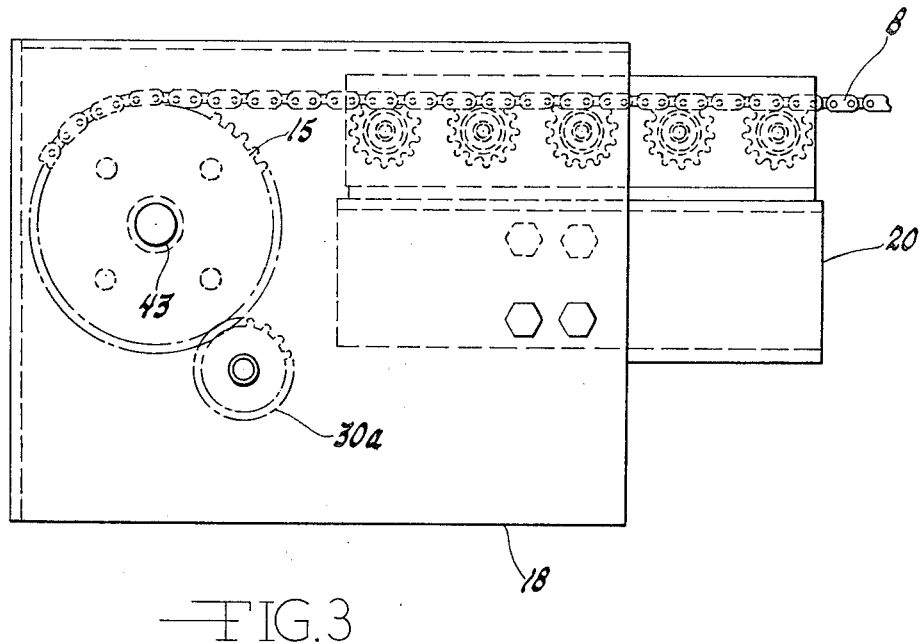
FIG. 3 is a fragmentary side elevational view of a conveyor driving station.

As shown in FIGS. 3 and 4 idler pulleys 30 and 30a are provided adjacent to driving pulley 15 and tensioning pulley 18 respectively to ensure proper wrap of the chain around the sprockets.

With reference to FIGS. 1, 2, 5, 6 and 7, the furnace is formed of modular frames 2, 3 and 4 having upper and lower furnace sections 31 and 31a. These are supported by upper frame member 32, vertical frame members 33, and bottom supports 34, 35 and 36.

The upper furnace sections, or portion thereof, can be raised from the lower sections or be provided with doors for obtaining access to the furnace. This is done to clean the furnace and to repair or replace rollers, etc.

Figure 5:
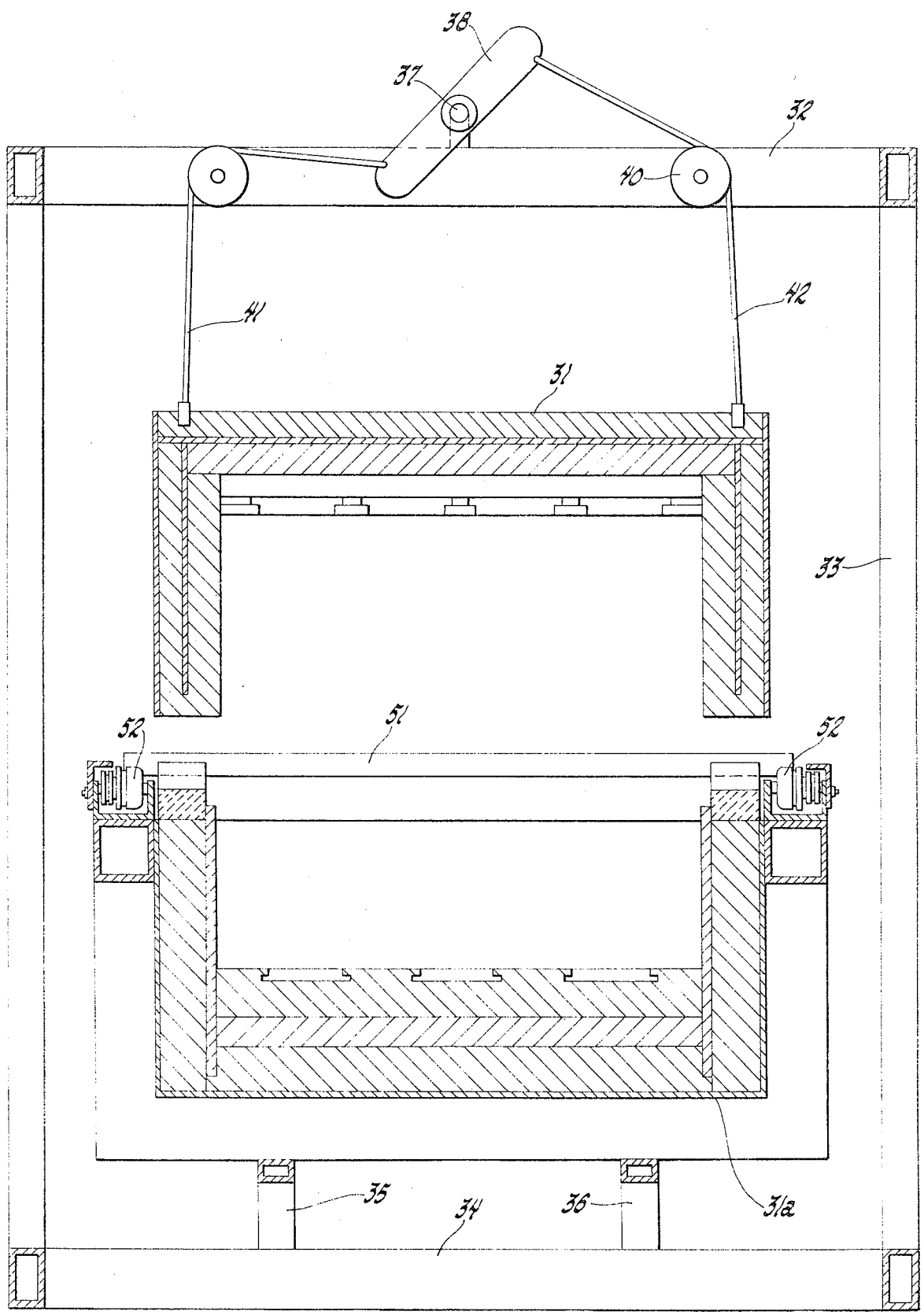
FIG. 5 is a sectional elevational view taken along line 5—5 of FIG. 2.
Figure 6:
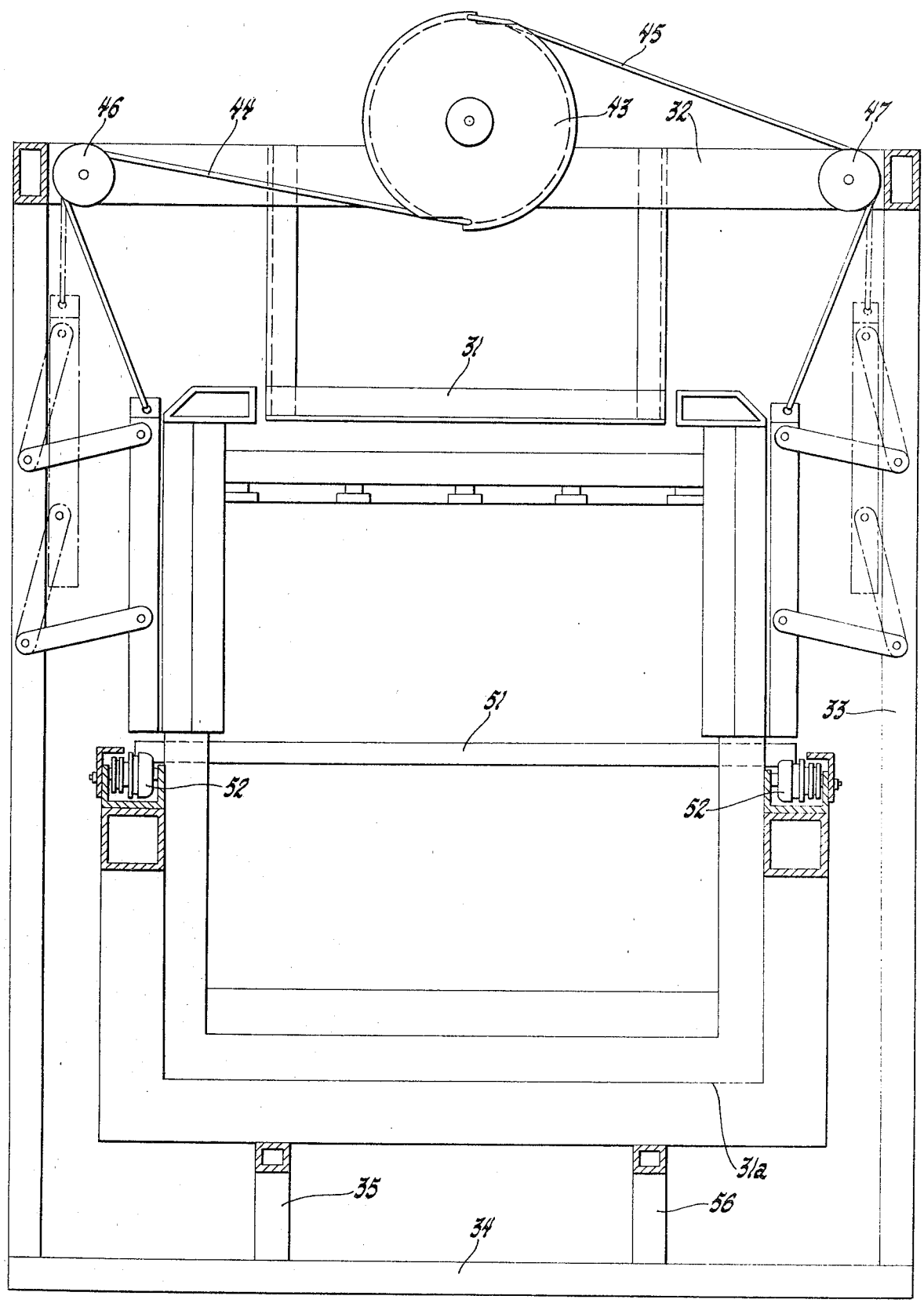
FIG. 6 is a sectional elevational view taken along line 6—6 of FIG. 2.
Figure 7:
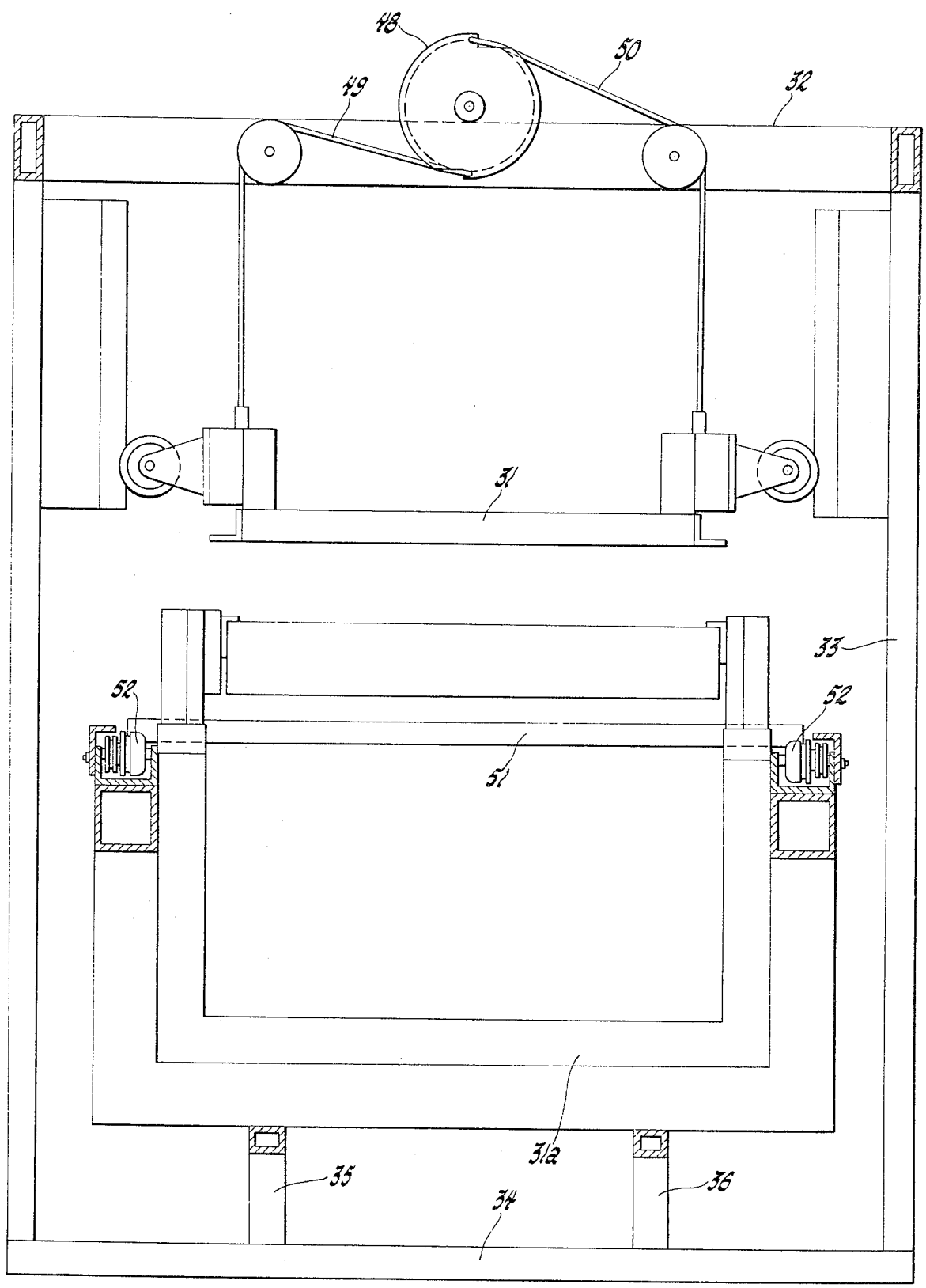
FIG. 7 is a sectional elevational view taken along line 7—7 of FIG. 2.

FIGS. 5, 6 and 7 illustrate various arrangements of furnace sections and raising and lowering means for the upper section. As seen in FIG. 5, they can be provided with a rotatable rod 37 connected to a arm 38, and a pair of pulleys and lifting cables 39, 40, 41 and 42. It is apparent that upon rotation of the rod the upper furnace section will be lifted or lowered as desired.

FIG. 6 shows a second form in which doors are provided. A rotatable pulley 43 and lift cables 44 and 45 and pulleys 46 and 47 are used for lifting and lowering the upper section doors.

FIG. 7 shows an arrangement substantially the same as that shown in FIG. 5 in which there is a pivotable pulley 48, and cables 49. In this instance the top 31 is lifted or lowered.

Within each of the furnace sections described with reference to FIGS. 5-7, there are provided heat resisting rollers 51. These are preferably of ceramic material. Rollers 51 form the conveyors for the glass to be treated in the furnace. With particular reference to FIGS. 8-16 it will be seen that these ceramic rollers comprise cylindrical members of uniform cross section which extend across the conveyor. They are supported adjacent each of their ends by a pair of drive rolls such as 52 and 53.

Each of the drive rolls comprises a driving portion 54, which directly engages the ceramic roller 51, and driven section 55. The driving portions of the rolls 52 have cylindrical openings 56 in which are received a cylindrical projection 57 of one of the driven sections 55. The dimensioning is such that it is necessary to force the member 57 into the opening 56. By this means the two portions of the drive rolls are welded together. Paired sprockets 58 and 59 are mounted on the driven section 55 for receiving the drive chain. Bushings 60 extend through openings 61, and support the roll members 52 and 53 on the shafts 62. The shafts extend into suitable openings 63 and 64 in a box-like section 65 of the conveyor drive support. The chains 7 and 8 extend over the sprockets 58 and 59, a chain guard 66 protects the chain from debris and also ensures that the chain is maintained in proper position.

The box-like sections 65 are secured to frame sections such as 67 by central bolts 68. The box-like sections are also supported by set screws 69, 70 and 71. These set screws provide means for obtaining a level and aligned position for the rollers 51 while the bolts 68 secure the box-like sections in their selected positions. Each of the drive rolls has a flange 72 which extends above the chain guard 66. This contributes to keeping the chain clean and also provides a guard for the ends of the ceramic rollers 51. Flange 72 limits any tendency of the rollers 51 to move from their proper positions with respect to the driving sections of the rolls.

It should be noted that the ceramic rollers simply rest upon the mating surfaces of the driving sections 54 of the rolls 52. Drive to the cylinders is by friction only. There is no direct drive by the chain or belt, nor are there any pins or other projections from the rollers 51. As a result the roller life expectancy is increased. It is also much easier to replace the rollers. They are simply lifted up to remove, and easily lowered into position to replace. There are no pins which must be inserted into slots or openings or the like. It should also be noted that the driving rolls are mounted outside the heating area. It is found that for example, that aluminum can be used for the driving sections 54.

The chain guards can be held in position by bolts, such as 73 and washers 74. Slots 75 provided in the guards permit vertical adjustment.

While sprockets such as 58 and 59 and chains have been shown, it will be understood that drive could be by belts. The words "chain", "driving rollers" and "sprockets" are accordingly used in a generic sense in this specification and the claims hereinafter set forth, and it will be understood they should be interpreted to include various devices within their dual meanings.

Although a certain preferred embodiment has been shown and described in detail, it should be understood that various changes and modifications may be made therein without departing from the scope of the appended claims.

I claim:

1. A conveyor for a glass treating furnace comprising:
   at least a pair of drive rolls on opposite sides of said furnace;
   means rotatably supporting said pairs of drive rolls;
   a heat resistant roller extending across said furnace;
   said rolls comprising driving portions drivingly contacting said roller, and supportingly contacting said roller adjacent opposite ends of said roller with said roller being unsupported between opposing pairs of drive rolls;
   said rolls including a flange extending above the point of contact between said rolls and said roller and forming a restraining shield for limiting movement of said roller longitudinally of its axis;
   said rolls further comprising a driven section extending outwardly from said flange and outwardly with respect to said roller;
   said driven section being of a diameter substantially less than said flange;
   said driven section being shielded from the roller by said flange; and
   driving means contacting said driven section and operable to drive said rolls to effect rotation of said roller.

2. The conveyor of claim 1, including:
   a guard extending over said driven section and into close proximity with said flange; and
   the driving means extending beneath said guard and being protected with said driven section by both said guard and said flange.

3. The conveyor of claims 1 or 2, including:
   said conveyor having a box-like section adjacent opposite ends of said roller;
   said rolls mounted within said box-like section;
   said rolls being rotatably supported by said sections; and
   said guard extending upwardly from said sections.

* * * * *